US008678886B1

(12) United States Patent
Nothum, Jr.

(10) Patent No.: US 8,678,886 B1
(45) Date of Patent: Mar. 25, 2014

(54) FOOD-PRODUCT LOADER FOR FOOD PROCESS LINES

(71) Applicant: Robert G. Nothum, Jr., Willard, MO (US)

(72) Inventor: Robert G. Nothum, Jr., Willard, MO (US)

( * ) Notice: Subject to any disclaimer, the term of this patent is extended or adjusted under 35 U.S.C. 154(b) by 0 days.

(21) Appl. No.: 13/573,997

(22) Filed: Oct. 18, 2012

Related U.S. Application Data

(60) Provisional application No. 61/627,797, filed on Oct. 18, 2011.

(51) Int. Cl.
*A22C 25/08* (2006.01)
(52) U.S. Cl.
USPC ............................................ 452/181
(58) Field of Classification Search
USPC ................................. 452/177–184
See application file for complete search history.

(56) References Cited

U.S. PATENT DOCUMENTS

| 3,340,790 | A | | 9/1967 | Simjian | 99/352 |
|---|---|---|---|---|---|
| 3,465,383 | A | * | 9/1969 | Willis et al. | 452/4 |
| 3,562,856 | A | * | 2/1971 | Eriksen | 452/181 |
| 4,078,517 | A | | 3/1978 | Catellano et al. | 118/16 |
| 5,060,562 | A | | 10/1991 | Forindez | 99/353 |
| 5,330,383 | A | * | 7/1994 | Ryan | 452/182 |
| 5,635,235 | A | | 6/1997 | Sanchez et al. | 426/496 |
| 6,495,182 | B1 | | 12/2002 | Stuck | 426/466 |
| 7,252,584 | B2 | * | 8/2007 | Kragh | 452/163 |
| 7,637,805 | B1 | * | 12/2009 | Bueide | 452/179 |
| 7,662,034 | B2 | * | 2/2010 | Van Hillo et al. | 452/167 |
| 7,886,657 | B2 | | 2/2011 | Nothum, Jr. | 99/352 |
| 8,517,806 | B2 | * | 8/2013 | Fillenworth et al. | 452/179 |

* cited by examiner

*Primary Examiner* — Richard Price, Jr.
(74) *Attorney, Agent, or Firm* — Jonathan A. Bay

(57) ABSTRACT

A food-product loader (16) has a conveyor (18) passing through its cabinet (26), and the cabinet (26) is formed with a bulk hopper (28). The loader (16) is loaded with elongate pieces of food-product by way of dumping a heaping mass of the food-product pieces into the bulk hopper (28) all at one time. The loader (16) ultimately handles the heap of food-product pieces such that, the loader (16) loads the pieces onto the conveyor 18 in neat lanes, with individual pieces slightly spaced apart from one another. To do this, the loader (16) is constructed with a series or array of soft-sided dispensing sleeves or funnels (20) which are mechanically massaged to tease out one piece at a time, and only one piece at a time.

20 Claims, 9 Drawing Sheets

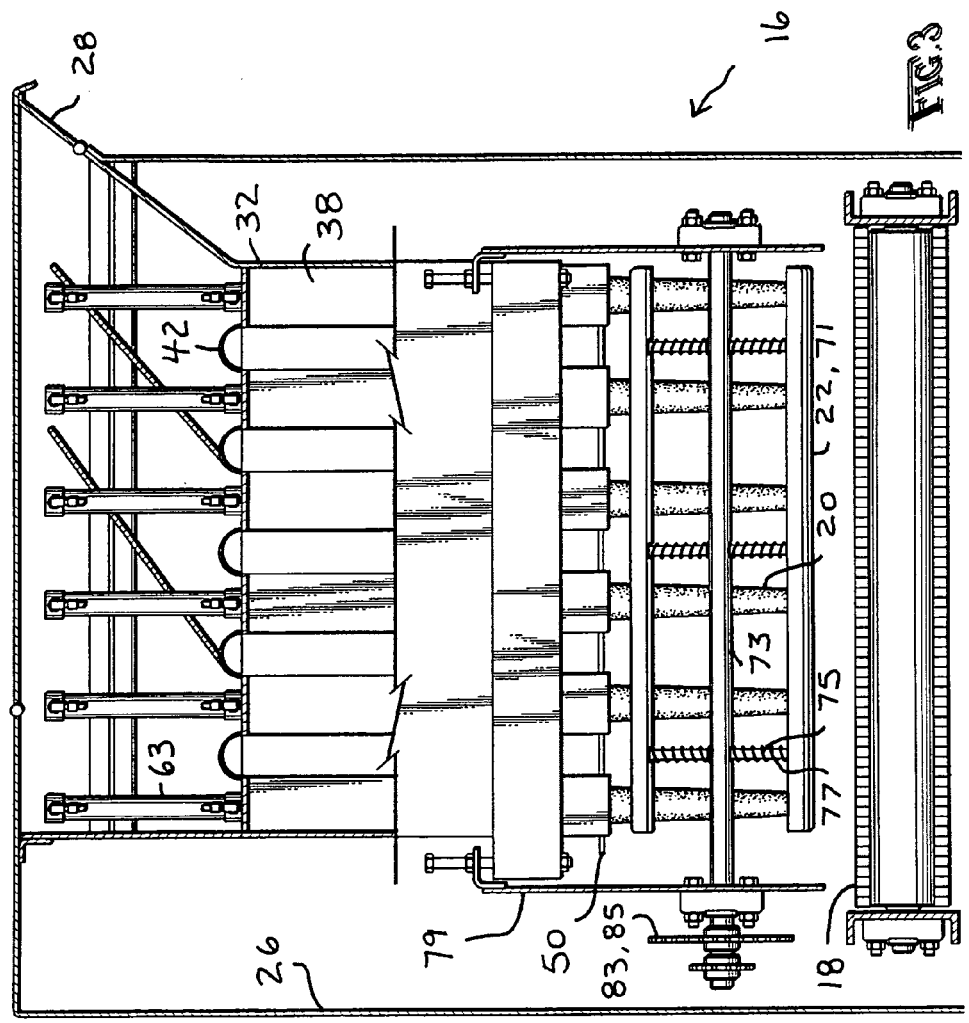

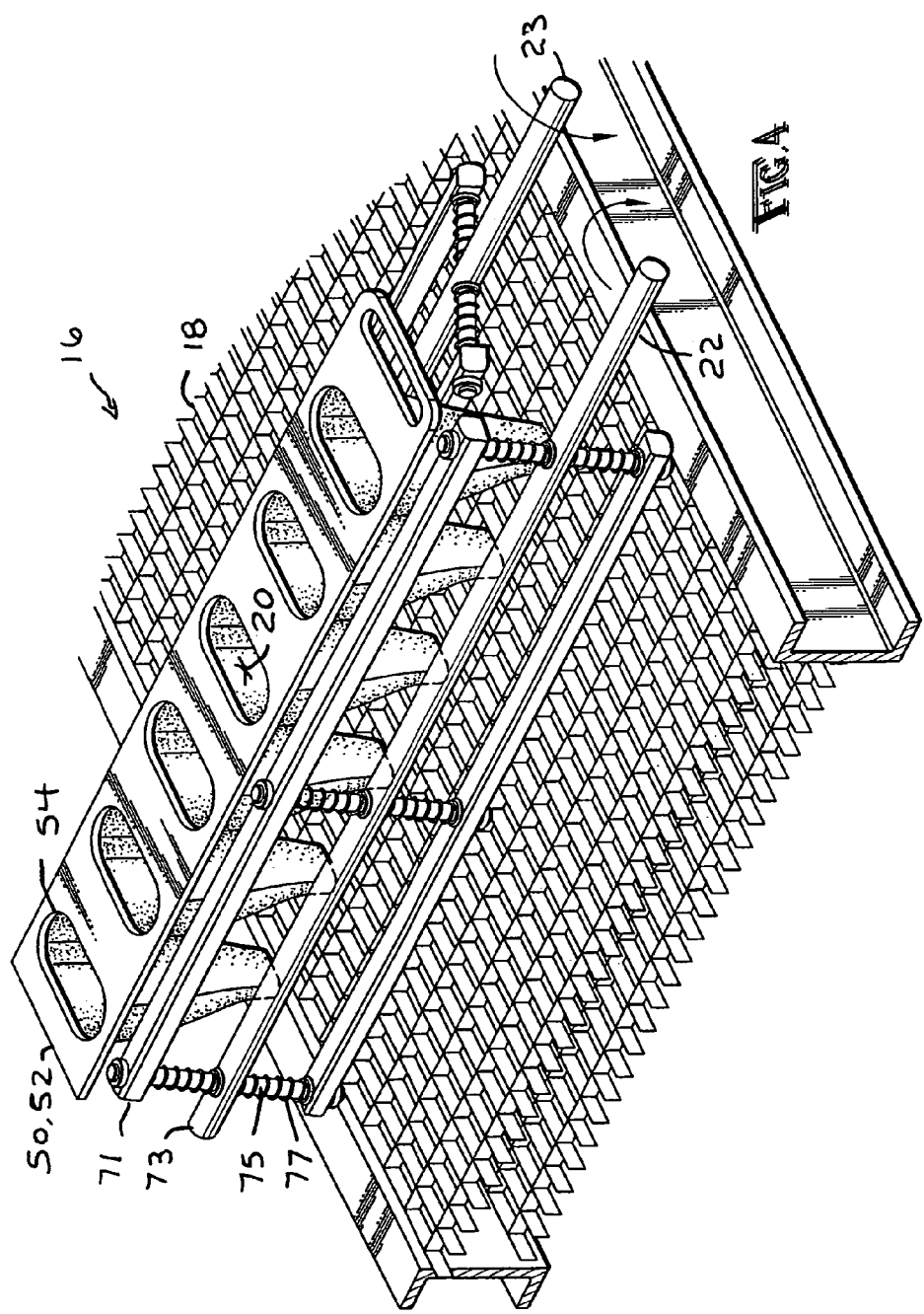

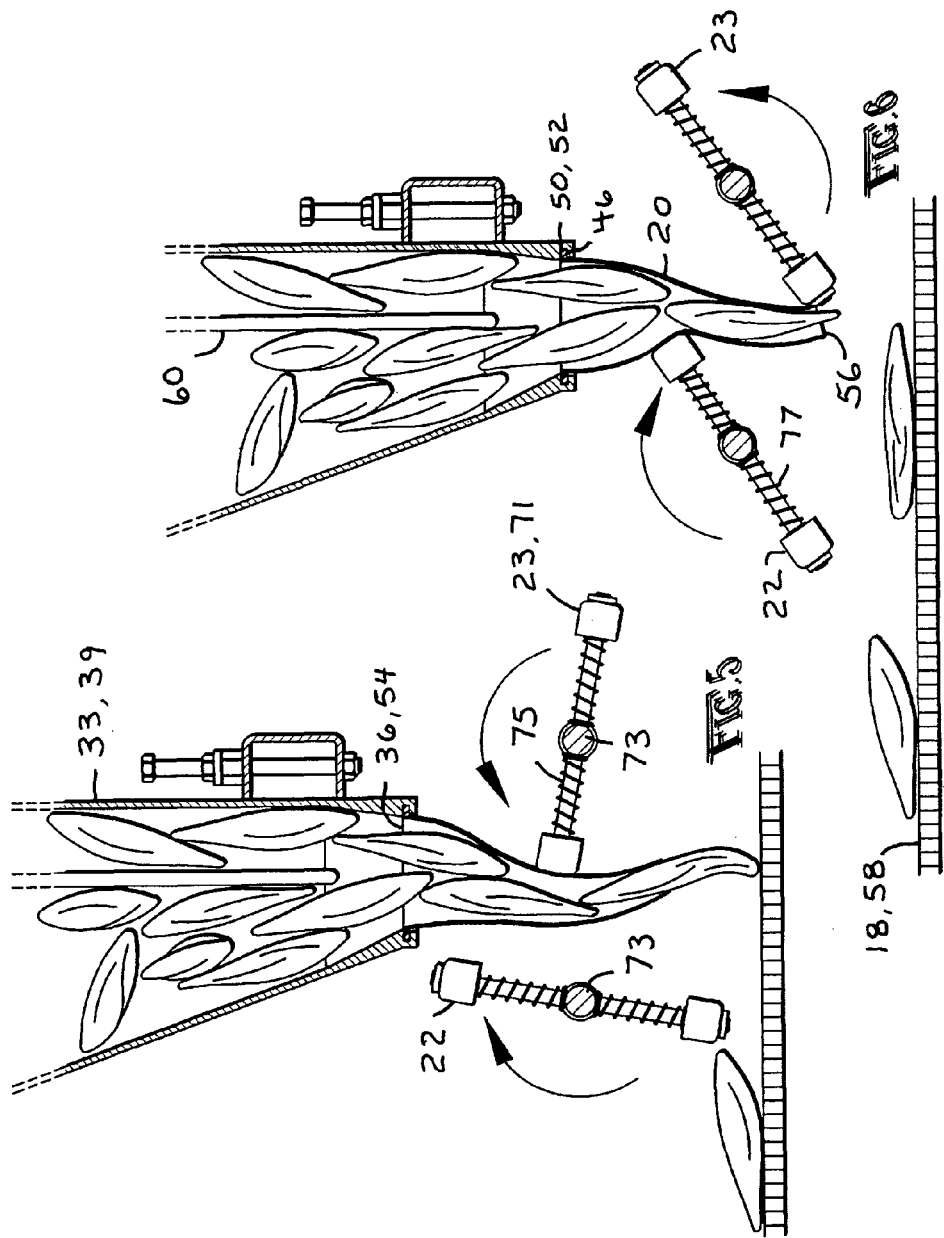

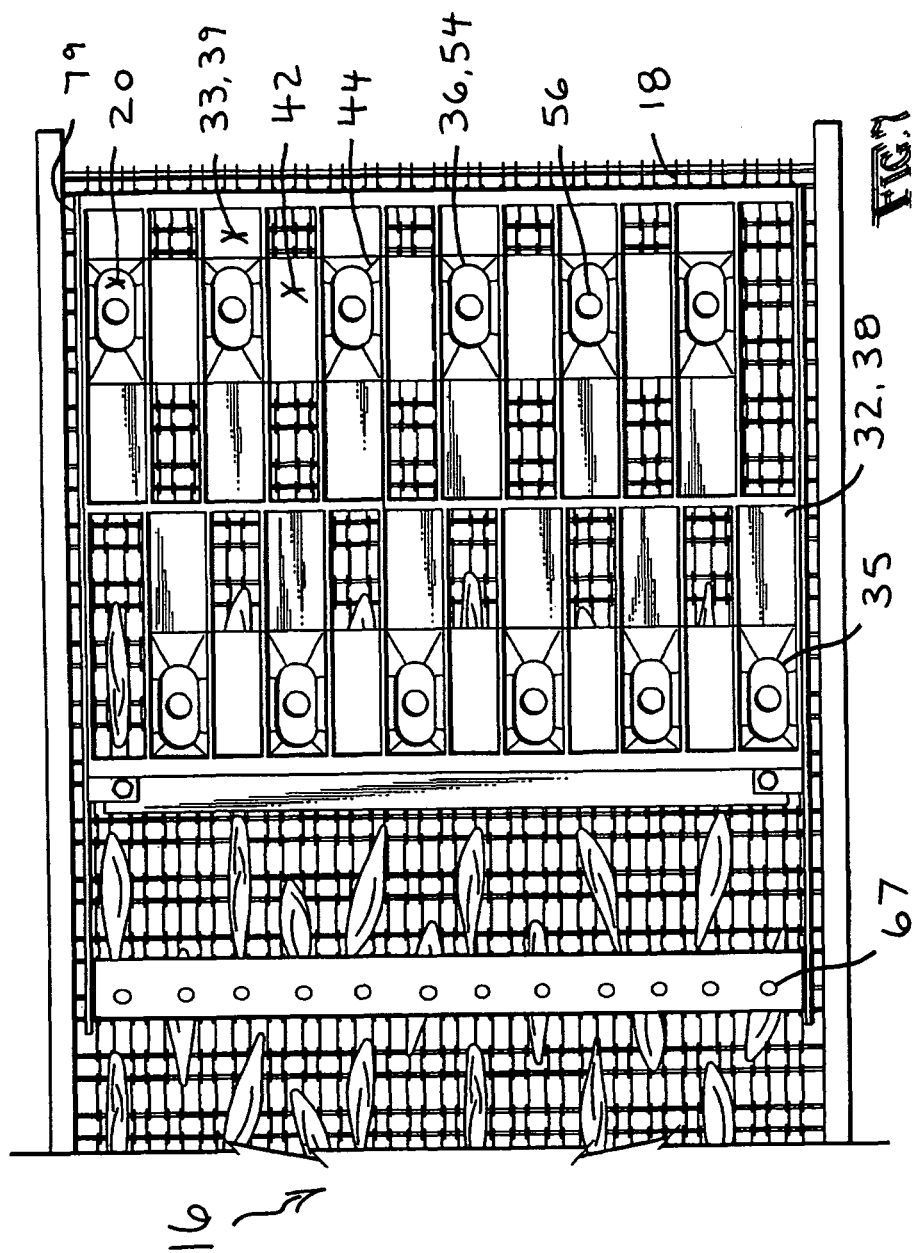

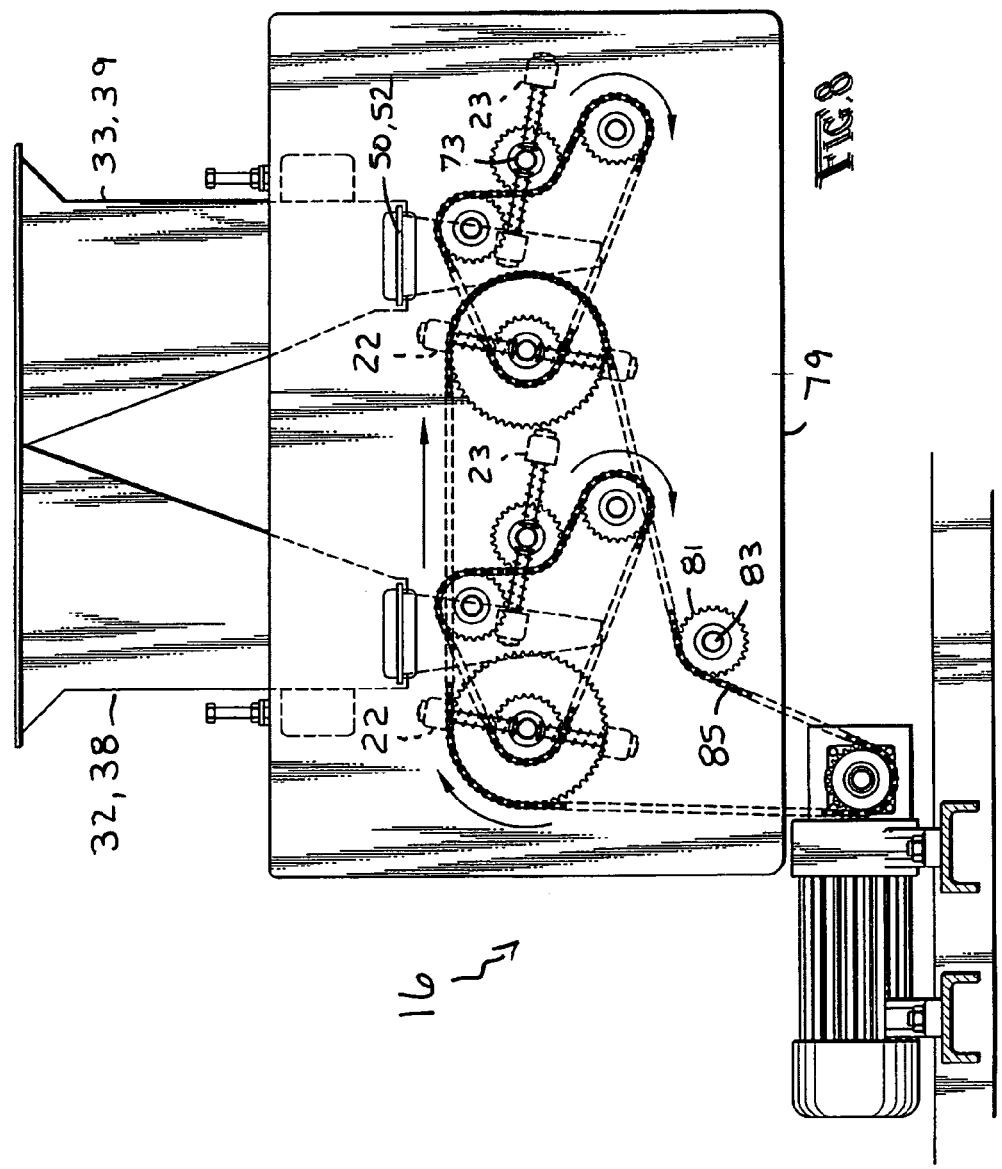

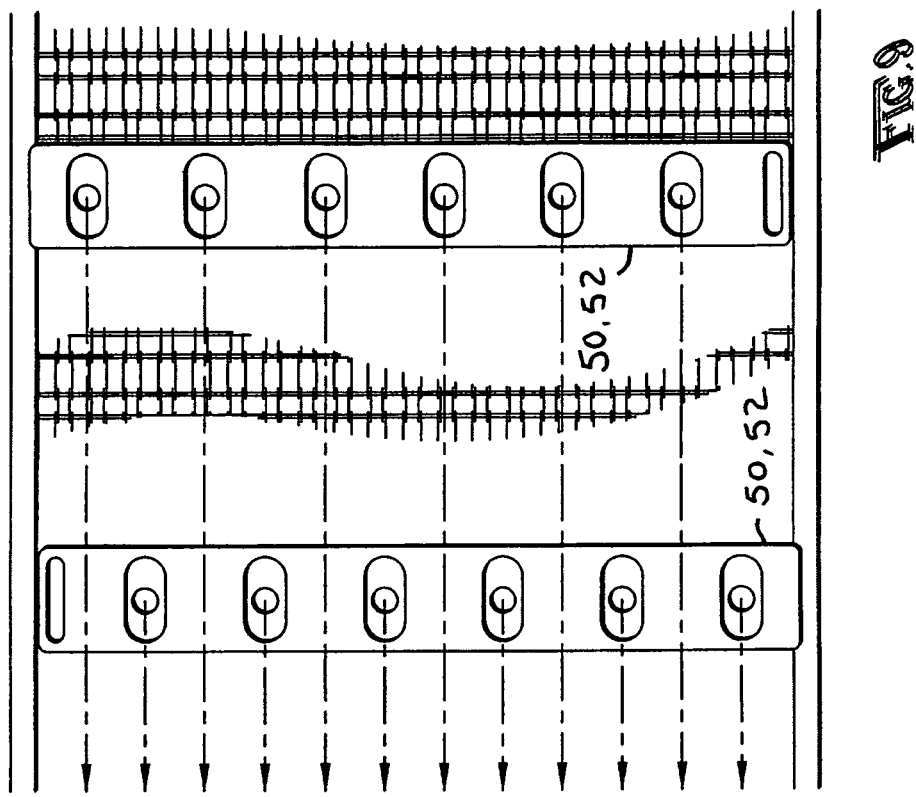

FOOD-PRODUCT LOADER FOR FOOD PROCESS LINES

CROSS-REFERENCE TO PROVISIONAL APPLICATION(S)

This application claims the benefit of U.S. Provisional Application No. 61/627,797, filed Oct. 18, 2011.

BACKGROUND AND SUMMARY OF THE INVENTION

The invention generally relates to automatic food process lines and, more particularly, to a food-product loader for the food process lines that dispenses a unit of a food product on the process line from the bottom of a bulk hopper.

It is an object of the invention to eliminate 50-100% of the labor in loading chicken tenders on a conveyor belt in a food process line (and like food products which are typically manually loaded), and reduce the footprint of such loading station by 50% or better too. Comparable food products include without limitation fish fillets.

By way of background, reference to a chicken "tender" can mean one of two things. The term "tender" can refer specifically to the "tenderloin" of a chicken. Or it can refer to imitations, namely, strips of breast meat (other than the tenderloin) cut to size and shape to simulate the true tenderloin. Regardless, both are boneless and skinless strips of chicken meat that have a shape, limpness and squishiness which makes them hard to handle by certain machines.

The United States Department of Agriculture (USDA) defines a poultry "tenderloin" as "the inner pectoral muscle which lies alongside the sternum." In other words, the tenderloin is the strip of muscle that runs along the inside of the breast, the part of the breast closest to the bone. The tenderloin separates easily from the rest of the breast.

However, the USDA definition is not officially enforced. In fact, neither "chicken tender" nor "chicken tenderloin" are officially enforced terms. So there is much confusion. The USDA has a policy which concludes as follows. "The terms tender and tenderloin have been used for a number of years for muscles from the breast without a clear-cut definition to distinguish between the two. The policy stated above appears to be what is being done in general practice."

The true tenderloin is a choice piece of meat but, when first removed from the breast and bone, it does have a tendon running through it. The tendon is basically gristle that has to be removed and then discarded.

A butcher shop might sell off chicken tenderloins fairly cheaply, just to get rid of them, and so it doesn't have fiddle with the tedious work of removing the tendon. In other contexts, the true "tenderloin" sells for a premium over the other part of the breast meat. And this is so in industries operating large-scale food processing lines. It pays to retrieve the true tenderloin because, the true tenderloin can be sold for quite an expensive premium.

Nevertheless, true "tenderloin" tenders and imitation tenders are about the same when it comes to loading them on a wide conveyor belt. To date, there has been no highly satisfactory mechanized way to transfer tenders from a bulk hopper to a wide conveyor belt in a neat orderly fashion (nor for fish fillets either). It is desired to load the tenders in a distributed fashion such that individual tenders are all slightly spaced apart from one another. And, true tenders have a smooth side. It is furthermore desired that the smooth side is up.

The challenges to loading tenders from a bulk hopper result from several factors. For one, chicken tenders have a distinct shape (or form). They are long and thin, hence the other common name "fingers." But they do have something like an elongated tear-drop shape. In the industry, the rounder of the two ends is referred to as the head as the tapered end is referred to as the tail (albeit, these names have nothing to do with the real head and tail of the live bird).

Another factor is the limpness or squishiness of the raw tenders. They have no bones nor any skin, and hence no tissue which gives the tenders any internal rigidity. Any attempts to stand a tender on its head or tail merely results in a collapsed over pile. In a bulk hopper, the tenders just sort of intertwine with one another in a mass like cooked macaroni.

A further factor relates to the slipperiness of raw tenders. True tenders have a smooth side and slightly rougher side. It may be due to these two different textures that, while overall a tender feels slippery like a banana peel, a mass of tenders will kind of adhere to one another.

Given the foregoing, to date there has been no highly satisfactory mechanized way to transfer tenders from a bulk hopper to a wide conveyor belt in a neat orderly fashion. Especially where it is desired to load the tenders in a distributed fashion such that individual tenders are all slightly spaced apart from one another, and smooth side is up.

So nowadays the standard practice is to have the tenders manually loaded. This requires room for a team of about a dozen people to stand aside the conveyor, six on each side. The tenders only travel down the line for as long as the team works. In other words, the chicken tenders take breaks along with the team of workers when they take their worker breaks.

It is an object of the invention to overcome the shortcomings of the prior art.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 3 is a sectional view taken along offset line III-III of FIG. 2;

FIG. 4 is a perspective view of a slide in accordance with the invention having a frame preferably made of plastic with six soft-sided funnel bags welded to it;

FIG. 5 is an enlarged-scale sectional view of detail V-V in FIG. 2;

FIG. 6 is a sectional view comparable to FIG. 5 except showing the massaging frames advanced a quarter of a turn;

FIG. 7 is a sectional view taken along line VII-VII of FIG. 2;

FIG. 8 is a side elevational view comparable to FIG. 2 except showing the splash shield;

FIG. 9 is a sectional view comparable to FIG. 7 except with portions broke away to show an alternative lane distribution of the individual dispensing funnels;

DETAILED DESCRIPTION OF THE PREFERRED EMBODIMENTS

Figure 1:
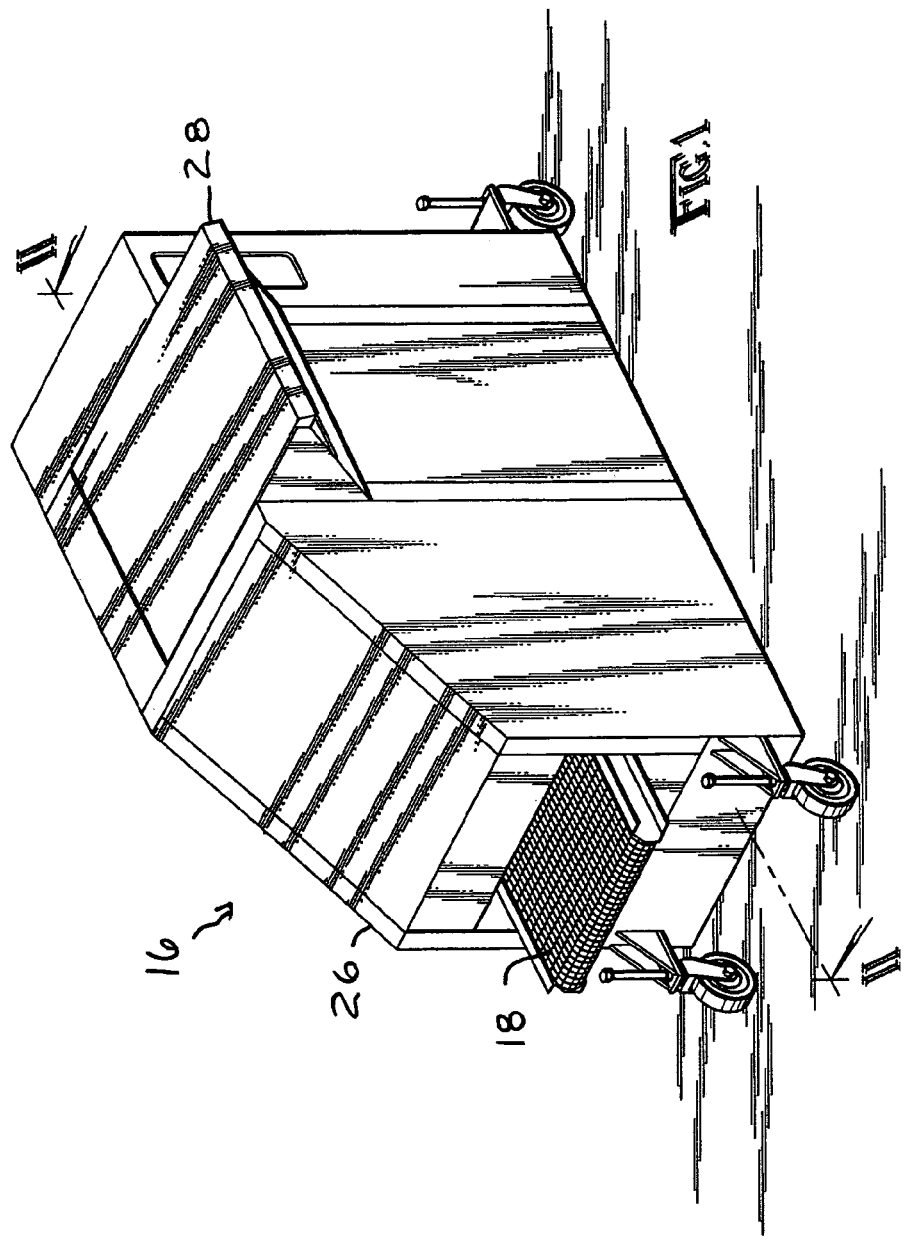
FIG. 1 is a perspective view of a food-product loader in accordance with the invention for food process lines.
Figure 2:
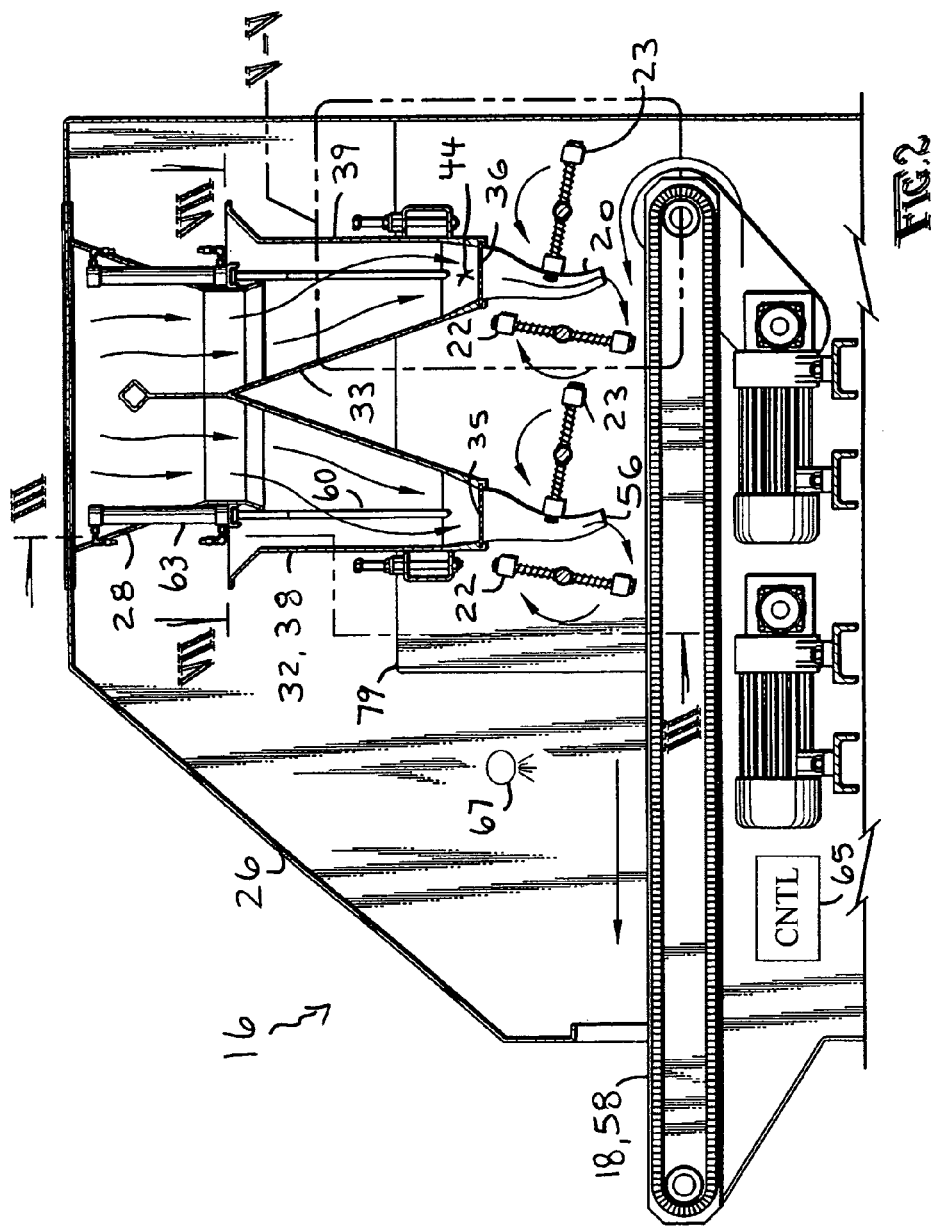
FIG. 2 is a sectional view taken along line II-II of FIG. 1.

FIGS. 1, 2 and 4 show a food-product loader 16 in accordance with the invention for dispensing pieces of food product on a conveyor 18, one piece at a time and not in a heap. Whereas the food-product loader 16 is loaded with the food-product pieces in a heap, the loader 16 handles the heap to ultimately load the conveyor 18 with single pieces that are slightly spaced apart from one another. FIGS. 5 and 6 show better the fundamental operating principle of the inventive food-product loader 16. It is an object of the invention to have the inventive food-product loader 16 serially dispense the food product pieces a single piece at a time onto the underpassing conveyor 18 by dropping them through a soft-sided sleeve or funnel. That way, the serially dispensed pieces will form neat lanes on the conveyor 18, with each piece slightly spaced apart from one another (see, eg., FIG. 7).

For convenience of terminology herein, 'line' refers to a line of food process machines and 'lane' refers to single file aisle of food product pieces on, for example, the conveyor 18 of the food process line.

The fundamental operating principle of the inventive food-product loader 16 includes the following. Individual pieces are dispensed out of soft-sided sleeves, or funnels 20. These soft-sided funnels 20 are inspired by a baker's cake-decorating bag, or icing bag. Each individual piece of food product is mechanically massaged out of the soft-sided funnels 20 by peristaltic (or peristaltic like) strokes on the funnel 20. The massaging strokes are provided by massaging frames 23, as will more particularly described below. The massaging frames 23, as shown, are driven to rotate about lateral axes. The rate of rotation is slows, perhaps a little faster than a rotisserie for a barbeque grill, but not by much.

FIG. 1 shows that the loader 16 has an outer cabinet 26 and is mounted on wheels for insertion into and removal away a food process line. Such food process lines (not shown) are typically a chain of machines performing separate operations such as and without limitation marinading, dusting (with flour and/or spices), tumbling, battering, breading, frying, freezing and packaging and so on. The food-product loader 16 in accordance with the invention would likely form the first machine in the food-process line, and discharge to the second machine. This second machine might perform any of the following operations: —namely, flour or spice pre-dusting, batter coating, bread crumb coating, or the like, for downline feeding to a fryer or oven, or grill-mark searing machine, and so on.

But preferably the loader 16 in accordance with the invention serves pieces of food-product in a fairly neatly distributed pattern, such as rows and lanes, like a parade of soldiers, or else a face-centered pattern, like a plate of marbles one-marble deep.

FIG. 1 shows that the loader 16's cabinet 26 has a bulk hopper 28 formed in the top. The cabinet 26 also has a food-product carrying conveyor 18 projecting out of a discharge opening in the cabinet 26 and turning over a nose roller.

FIG. 2 is an axial section view of the inside of the cabinet 26. The hopper 28 splits at its bottom elevation into two rows of manifolds, a front row manifold 32 and rear row manifold 33. FIG. 3 is an elevational cross-sectional view of the inside of the cabinet 26 as indicated by offset cutting line in FIG. 2, except just showing structure associated with the front row manifold 32. But the hopper 28 (among other structural features) is shown in FIG. 3. The hopper 28 has a solid-panel construction (preferably stainless steel panel) and has a slanting outer wall and intermediate slanting vanes to better distribute the food pieces on top of the manifolds 32 (and 33).

FIG. 7 shows both the front row and rear row manifolds 32 and 33. The front row manifold 32 is divided into six outlet ports 35, and, the rear row manifold 33 is likewise divided into six outlet ports 36. However, the six ports 35 of the front row manifold 32 are alternately staggered with the six ports 36 of the rear row manifold 33 such that together, the two rows 35 and 36 deposit individual pieces of food product in twelve 'lanes' or aisles across the conveyor 18.

So again, FIG. 3 shows only the front row manifold 32 (ie., the rear row manifold 33 has been removed from the view for clarity, but is similar except for being staggered). The front row manifold 32 is partitioned into six columnar chutes 38. The front row columnar chutes 38 are laterally spaced apart from one another in what would be, with reference to FIG. 7, the even-numbered lanes across the conveyor 18 (from top to bottom). The rear row manifold 33 is likewise partitioned into six columnar chutes 39. The rear-row columnar chutes 39 are laterally spaced apart from one another in what would be the odd-numbered lanes across the conveyor 18.

FIG. 3 shows that neighboring front row columnar chutes 38 (and this is applicable to rear row columnar chutes 39 as well) have their upper rims connected by arched bridges 42. That way, food product pieces do not rest stably on any given arched bridge 42. Instead, the food product pieces will tumble left or right off the given bridge 42 into one or the other of the chutes 38 that flank the given bridge 42.

FIGS. 2 and 7 show that the columnar chutes 38 and 39 have bottom ends which funnel inward with a funnel portion 44, which is constructed of the same hard material (preferably stainless steel sheet) as the rest of the cabinet 26, including the hopper 28 and manifolds 32-33. The rigid-wall funnel portion 44 of the manifold chutes 38 and 39 terminate in the respective oval ports 35 and 36, as shown in FIG. 7.

As FIGS. 2 and 5-6 show better, the chutes 38-39 of the manifolds 32-33 indeed have the rigid-wall funnel portions 44 which terminate in the outlet ports 35-36 for the chutes 38-39. However, the sidewalls of the chutes 38-39 from lateral left to right (which is directly into the view of FIGS. 2, 5 and 6) are thickened at the very bottom. The inner margins near the bottom ends of the chutes 38-39 are formed with opposing front and rear grooves 46 in the front and rear sidewalls of the bottom of the rigid-wall funnel portion 44. These grooves 46 accept the insertion of a removable slide 50 in accordance with the invention.

This slide 50 is better shown by FIG. 4. The slide 50 comprises a planar frame 52 preferably constructed of plastic. The planar frame 52 is apertured with a row of six oval ports 54 that match the six oval ports 35 or 36 of the front-row or rear-row manifold 32 or 33 as the case may be. The plastic frame 52 has six soft-sided funnels 20 welded to it at each of the six oval ports 54. The soft-sided funnels 20 are presumable constructed from a polymeric material which will allow 'welding' to the plastic frame, albeit perhaps by ultra-sonic welding. These six soft-sided funnels 20 continue the funnel shape formed by the rigid-wall funnel portions 44 of the chutes 38 or 39 that are immediately above the soft-sided funnels 20.

These soft-sided funnels 20 are inspired by a baker's flexible, cake-decorating bag (or icing bag). These soft-sided funnels 20 are tapered from top to bottom, and, are open at both the top and bottom. The bottom terminates in the ultimate dispensing port 56 for the single pieces of food product.

The dispensing port 56 is located at an elevation that is spaced just a short drop above the food-product carrying run 58 (ie., the upper run) of the conveyor 18.

The slide 50 is removable and replaceable on a schedule with a fresh new (eg., never-before-used) slide 50. The removed slide 50 is not re-used. Perhaps the frame 52 might be re-furbished or recycled, but the soft-sided funnels 20 are discarded. Preferably the cleaning schedule is every four, six or eight hours of run time, or the like.

FIGS. 2, 5 and 6 show better that, centered inside each columnar chute 38 or 39 there is a de-clogging plunger 60 aimed at de-clogging a respective bottom-end of the rigid-walled funnel portion 44 of the chute 38 or 39 as well as the soft-sided flexible funnel 20 below. If a piece or pieces of food-product get bunched up in and/or clog a soft-sided funnel 20, the respective de-clogging plunger 60 activates and plunges down on an extension stroke to clear the pieces out. The plungers 60 might have pneumatic actuators 63 operated by solenoid valves (or in fact just plain be solenoid actuators) that are actuated by a controller 65.

The controller 65 would be connected to sensors 67 for sensing whether pieces of food-product are dispensing out of each soft-sided funnel 20, or not. If not, the assumption is that, the soft-sided funnel 20 is clogged, and needs to be de-clogged. In other words, the controller 65 sends a signal to the plunger 60's actuator 63 to activate the plunger 60.

Each soft-sided funnel 20 is mechanically massaged not only to dispense one single piece of food product to the conveyor 18 below, but also limit the dispensing to one single piece at a time. It is preferred to massage the soft-side sleeves or funnels 20 with a peristaltic action, or something that bears a reasonable similitude to a peristaltic action.

One peristaltic similitude to dispense a single piece at a time would be to 'milk' the piece through a soft tubular sleeve, somewhat like milking a cow. However, it is preferred to give the soft-sided dispensing tube a funnel shape as funnels 20 because that improves the chances of getting the elongate, finger-sized pieces or so to orient along vertical axes.

Trials have been performed with flanking the soft-sided funnels with four or so eccentric rollers, each of a different diameter, and at a different elevation. The largest diameter roller was at the highest elevation and along one side the funnel 20, the second largest roller staggered a little bit lower than the largest and on the opposite side of the funnel 20, a smaller roller still a little bit lower then the second largest but back on the one side of the funnel 20, and the smallest roller of the four slightly below the third and back to the opposite side. That configuration worked fair.

However, the construction shown best by FIGS. 5 and 6 is preferred because it works apparently as well, and is simpler to construct and time. Each row of six funnels 20 are flanked between a pair of massaging frames 22 and 23. There are two massaging frames 22-23 for the front row of soft-sided funnels 20 and two other massaging frames 22-23 for the rear row of soft-sided funnels 20 (rear row only shown in FIGS. 5 and 6).

FIGS. 3 and 4 are rear-looking views of the front row of soft-sided funnels 20. There are six soft-sided funnels 20 in this row (as there are another six in the rear row). All six front-row soft-sided funnels 20 are served by one downline massaging frame 22 and one upline massaging frame 23. The rear row funnels (not shown in FIGS. 3 and 4) are served by their own upline and downline massaging frames 22-23 (see FIG. 2).

Again, FIGS. 5 and 6 show better the fundamental operating principle of the food-product loader 16 in accordance with the invention. It is an object of the invention to have the inventive food-product loader 16 accept a bulk load of chicken tenders (or the like) in the bulk hopper 28, after which the tenders travel through the chutes 39 (and this is applicable to front row columnar chutes 38 as well) of the rear-row manifold 33 to be dispensed—a single piece at a time per lane—onto the underpassing conveyor 18. That way, the serially dispensed pieces will form a single file lane on the conveyor 18, and as shown by FIG. 7, slightly spaced apart from one another.

For each lane, an individual piece of food product is serially dispensed out of the soft-sided funnel 20 therefor. Each individual piece of food product is mechanically massaged out of the soft-sided funnels 20 by alternating down strokes on opposite sides of the funnel 20 by the massaging frames 22-23.

Moreover, the strokes are relatively slow speed. Here, the construction of the massaging frames 22-23 comprises a pair of rotating paddle-wheels. The rate of rotation is a little faster than a rotisserie for a barbeque grill, but not by much.

Needless to say, the soft-sided funnels 20 are funnel shaped. They have an open, oval intake port (eg., 54) into which pieces of the food-product fall into (eg., gravity feed to this elevation at least). Whereas these soft-sided funnels 20 are inspired by a baker's icing bag, it is believed that bakers use their bags by means of rolling the bag from the top down to the small funnel end in order to squeeze out the icing.

Here, the soft-sided funnels 20 are put to use to squeeze out one single, generally elongate piece of food-product at a time. The preferred food product for service in the loader 16 in accordance with the invention includes without limitation chicken tenderloin, chicken breast sliced up to simulate chicken tenderloin or otherwise comprise a chicken finger product, fish fillets, and so on.

The massaging frames 22-23 have a paddle-wheel construction wherein they only have just a pair of diagonally-opposite paddles 71. More particularly, the massaging frames 22-23 have a central shaft 73, a number of (eg., three) axially-spaced spokes 75, and the pair of outboard paddles 71 as mentioned before.

The downline and upline massaging frames 22 and 23 are 90° out of phase with each other, and turn at the same slow-speed, sort of rotisserie style. FIG. 5 shows one paddle 71 of the upline massaging frame 23 orbiting through a downward stroke against the soft-sided funnel 20, while both paddles 71 of the downline massaging frame 22 are 'hands' off. FIG. 6 shows the massaging frames 22-23 advanced a quarter of a turn. Now, one paddle 71 of the downline massaging frame 22 is initiating its downward stroke against the soft-sided funnel 20, while the paddle 71 of the upline massaging frame 23 is just about to separate away from the soft-sided funnel 20 to a 'hands' off position.

In this fashion, the massaging frames 22-23 massage out a single item of food product from a soft-sided funnel 20. At the elevation of the plane containing the shafts 73, the funnel alternately cycles through strokes of being compressed into an oval pushed upline by the downline massaging frame 22, to restoring itself to a circle on its axis while both massaging frames 22-23 are temporarily 'hands' off, to being compressed into an oval pushed downline by the upline massaging frame 23. The funnel 20 returns to the starting position above by restoring itself once again to a circle on its axis (while once again both massaging frames 22-23 are temporarily 'hands' off). And this cycle repeats endlessly.

As FIGS. 5 and 6 show, the hopper 28 (including the rear-row manifold chutes 39) above the level of the slide frame 52 can have plural pieces of food product crammed side by side. However, the lower end of the front row manifold chutes 39 (and this is applicable to front row columnar chutes 38 as well), comprising the rigid-walled funnel part thereof, and the continuation of the funnel shape of the soft-sided funnels 20, cooperatively tend to orient the elongate pieces of food-product in a vertical orientation. Even though the oval intake ports 54 of the slide 50 at the top of the soft-sided funnels 20 might admit plural two pieces or more of food product at time, the massaging frames 22-23 tend to massage out only a single piece at a time onto the underpassing conveyor 18. Indeed, it is believed when the operation is operating smoothly, only a single piece of food product at a time traverses in the soft-sided funnels 20 below the elevation of the plane containing the shafts 73 of the massaging frames 22-23. As the massaging frames 22-23 continuously turn, and as the underpassing conveyor 18 continuously runs, the single pieces of food product deposit into neat, single-file lanes on the conveyor 18.

FIG. 7 shows this better. In fact, the six soft-sided funnels 20 of the front row manifold 32 are staggered in alternate lanes with the six soft-sided funnels 20 of the rear row manifold 33. Given the continuous turning of the massaging frames 22-23 and run of the conveyor 18, the pieces of food product are loaded neatly onto the conveyor 18 as shown.

FIG. 8 shows a splash shield 79 that is on the far side of the conveyor 18 relative to FIG. 2 (left side of the conveyor 18 in the view of FIG. 3). The splash shield 79 supports the hubs 81 for the sprockets 83 of the chain-drive system 85 of the massaging frames 22-23.

Figure 11:
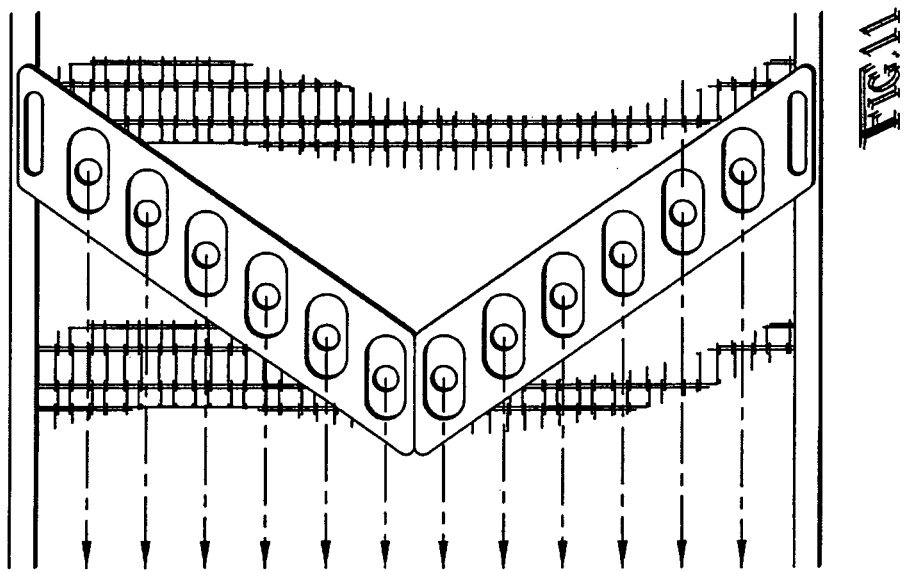
FIG. 11 is a sectional view comparable to FIGS. 9 and 10 except showing still a further configuration for lane distribution among the individual dispensing funnels.
Figure 10:
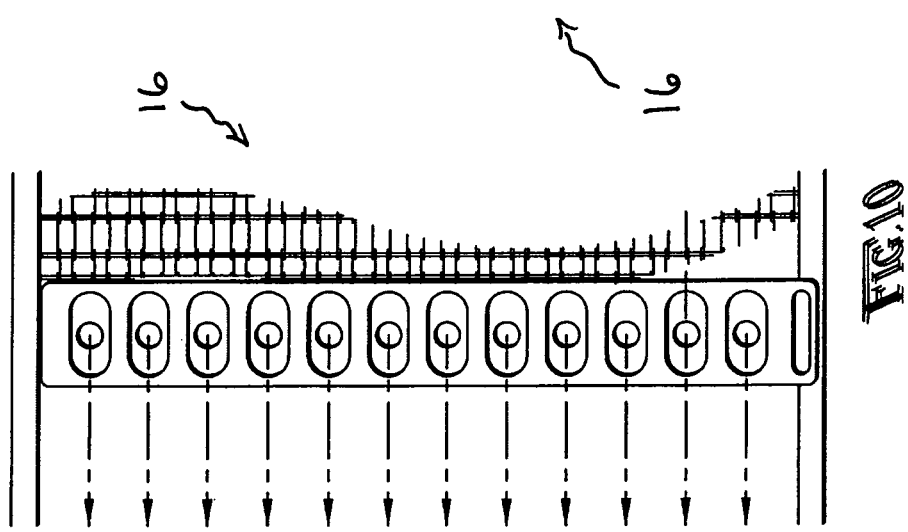
FIG. 10 is a sectional view comparable to FIG. 9 except showing another configuration for lane distribution among the individual dispensing funnels.

FIG. 9 is a sectional view comparable to FIG. 7 except with portions broken away and showing an alternate configuration of lane distribution for the individual dispensing funnels 20. FIG. 10 is a sectional view comparable to FIG. 9 except showing still another configuration for lane distribution among the individual dispensing funnels 20. FIG. 11 is a sectional view comparable to FIGS. 9 and 10 except showing still a further configuration for lane distribution among the individual dispensing funnels 20.

Other aspects of the invention include the following. The prior art way of loading chicken tenders or chicken fingers has workers manually spreading them out on a conveyor 18, in order to get separation between pieces individually, before coating or freezing. Again, according to the prior art way of doing this work, it is being done manually. As many as a dozen workers might be loading a forty-inch wide conveyor 18 with tenders or fingers. Also, the loading station might have a run of twelve feet in length. In other words, the loading station might have a foot-print twelve feet long on the factory floor.

It is an aspect of the invention to automatically load food product such as and without limitation tenders or fingers through an array of soft-sided dispensing funnels 20, and massage or tease the tenders or fingers out of the dispensing funnels 20 one tender or finger at a time.

It is another aspect of the invention that the soft-sided funnels 20 are disposable—which is convenient at clean-up time for sanitary purposes. It is an object of the invention to replace the soft-sided dispensing funnels 20 every four, six, eight hours: —or at least every shift.

The food-product loader 16 is provided in accordance with the invention such that loading takes place at an overhead station that has, for example and without limitation, a dozen or so soft-sided dispensing funnels 20 over a forty-inch or so wide conveyor 18, formed in two rows, six in one row, and five or six in the other row, and staggered in separate lanes.

Sometimes, the funnels 20 clog. Two tenders may wedge together trying to pass at the same time through the small funnel opening in the soft-sided dispensing funnel 20, and, get stuck. There is a de-clogging plunger 60 to push one or both through if need be. Trials have shown that, if the soft-sided dispensing funnel 20 is massaged right, the tenders and/or breasts naturally form a head-to-toe procession of individual pieces, and dropout one by one.

The paddles 71 on the massaging frames 22-23 can yield away from the soft-sided funnels 20 by virtue of mountings that slide on the spokes 75 that carry them, and backed by compression springs 77. That way, the massaging strokes are not too vigorous, and if there is a clog in the soft-sided funnels 20, the paddles 71 do not damage themselves, nor the soft-sided funnels 20, and not the plungers 60 too if any is in a mid-actuation stroke.

There are a series of transceiving sensors 67 that might train a signal on the outflow section of the conveyor 18. The transceivers can continually output to the controller 65. The controller 65 can determine if one lane or the other has a missing occupancy in the lane-by-lane procession of the pieces of food product. If after so long of time, there has not been an underpassing piece of food-product in a given lane, the controller 65 can be programmed to presume that the missing occupancy is due to the soft-sided dispensing funnel 20 of the given lane being clogged, and give the plunger 60's actuator 63 for that funnel 20 the de-clog signal.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A food-product loader for accepting a load of elongate pieces of food product in a heaping mass and thereafter loading such pieces onto a moving conveyor in a pattern such that most of the individual pieces are spaced apart from one another; said loader comprising:
    a hard-walled cabinet formed with a bulk hopper that has an introduction inlet end and transitions into a plurality of chutes, each of which chutes terminates in a lower portion that tapers inwardly to form a rigid-walled funnel portion;
    each rigid-walled funnel portion defining an outlet port;
    a plurality of soft-sided sleeves or funnels for mating with each outlet port of each of the plurality of chutes;
    each soft-sided sleeve or funnel terminating in an ultimate dispensing port at an elevation above the food-carrying run of the moving conveyor; and
    flanking massaging elements to massage spaced sides of the soft-sided sleeves or funnels for massaging or teasing out one piece of food product at a time.

2. A food-product loader for loading elongate pieces of meat onto an underpassing conveyor; comprising:
    a bulk hopper, adapted to receive a bulk supply of the elongate pieces of meat, having a chute portion extending between a high elevation portion thereof and a low elevation portion thereof, and, being formed with an outlet port proximate the low elevation portion thereof;
    an elongated dispensing tube suspended below the outlet port and being elongate between an intake port, adapted to receive elongate pieces of meat from the outlet port of the chute portion of the hopper, and, a dispensing port, adapted to dispense single pieces at a time of the elongate pieces of meat onto the underpassing conveyor;

said the dispensing tube comprising a single-piecing configuration adapted for optimizing the through passage of, not plural pieces but, single pieces at a time of the elongate pieces of meat.

3. The food-product loader of claim 2 wherein:
the single-piecing configuration of the dispensing tube comprises the dispensing tube having soft sides.

4. The food-product loader of claim 3 further comprising:
an itemizing mechanism mounted in conjunction with the dispensing tube to assist the dispensing of the pieces of food-product one piece at a time.

5. The food-product loader of claim 4 wherein:
the itemizing mechanism operates on the dispensing sleeves outer sidewall to induce a peristaltic, or peristaltic like, stroking action thereon, to induce one piece of food product at a time to exit the dispensing port of the dispensing tube.

6. The food-product loader of claim 5 wherein:
the itemizing mechanism comprises flanking strokers on opposite sides of the dispensing tube, which is suspended therebetween, stroking the opposite sides of the dispensing tube in alternate turns relative to the two side.

7. The food-product loader of claim 5 wherein:
the itemizing mechanism comprises a pair of massaging frames on opposite sides of the dispensing tube, which is suspended therebetween.

8. The food-product loader of claim 7 wherein:
the massaging frames comprise a paddle wheel construction, each massaging frame comprising a plurality of rotating paddles for stroking the opposite sides of the dispensing tube in alternate turns between the massaging frames.

9. The food-product loader of claim 8 further comprising:
a plurality of dispensing tubes distributed across a lateral width of the underpassing conveyor.

10. The food-product loader of claim 9 wherein:
the plurality of dispensing tubes are arranged at least in one row; and
the pair of massaging frames are elongate such that said pair of massaging frames alone services all of the dispensing tubes of said row.

11. The food-product loader of claim 3 further comprising:
a plunger and actuating mechanism therefor, mounted relative to the hopper to have a cycle between upper and lower extremes, including an extension stroke at least partly down into the core of the dispensing tube for assisting the unclogging of presumptive clogs, and, a retraction stroke back to the upper extreme.

12. The food-product loader of claim 2 wherein:
the single-piecing configuration of the dispensing tube comprises the dispensing tube having a funnel shape, with the intake port of the dispensing tube being relatively larger than the dispensing port therefor.

13. The food-product loader of claim 12 wherein:
the single-piecing configuration further comprises the dispensing tube having soft sides.

14. The food-product loader of claim 13 further comprising:
an itemizing mechanism mounted in conjunction with the dispensing tube to assist the dispensing of the pieces of food-product one piece at a time.

15. The food-product loader of claim 14 wherein:
the itemizing mechanism operates on the dispensing sleeves outer sidewall to induce a peristaltic, or peristaltic like, stroking action thereon, to induce one piece of food product at a time to exit the dispensing port of the dispensing tube.

16. The food-product loader of claim 15 wherein:
the itemizing mechanism comprises a pair of massaging frames on opposite sides of the dispensing tube, which is suspended therebetween.

17. The food-product loader of claim 16 wherein:
the massaging frames comprise a paddle wheel construction, each massaging frame comprising a plurality of rotating paddles for stroking the opposite sides of the dispensing tube in alternate turns between the massaging frames.

18. The food-product loader of claim 17 further comprising:
a plurality of dispensing tubes distributed across a lateral width of the underpassing conveyor.

19. The food-product loader of claim 18 further comprising:
a plurality of plungers, one for each dispensing tube;
and actuating mechanism therefor;
wherein each plunger is mounted relative to the hopper to have a cycle between upper and lower extremes, including an extension stroke at least partly down into the core of the respective dispensing tube for assisting the unclogging of presumptive clogs, and, a retraction stroke back to the upper extreme.

20. The food-product loader of claim 19 further comprising:
at least one detector for detecting the absence of food-product being dispensed by any of said plurality of dispensing tubes, and,
a controller connected to the detector as well as the plurality of plungers' actuating mechanism for actuating for one or more of the plungers in response to detector detection.

* * * * *